United States Patent
Hao et al.

(10) Patent No.: US 9,310,527 B2
(45) Date of Patent: Apr. 12, 2016

(54) ANTIREFLECTIVE FILM COMPRISING LARGE PARTICLE SIZE FUMED SILICA

(75) Inventors: Encai Hao, Woodbury, MN (US);
Jun-Ying Zhang, Perrysbury, OH (US);
Robert F. Kamrath, Mahtomedi, MN (US); Lan H. Liu, Rosemount, MN (US); Ming Cheng, Woodbury, MN (US); Jung-Sheng Wu, Woodbury, MN (US); Mark J. Pellerite, Woodbury, MN (US); Richard J. Pokorny, Maplewood, MN (US); Suresh S. Iyer, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 131 days.

(21) Appl. No.: 13/976,535

(22) PCT Filed: Feb. 17, 2012

(86) PCT No.: PCT/US2012/025573
§ 371 (c)(1),
(2), (4) Date: Jul. 31, 2013

(87) PCT Pub. No.: WO2012/121858
PCT Pub. Date: Sep. 13, 2012

(65) Prior Publication Data
US 2014/0022644 A1    Jan. 23, 2014

Related U.S. Application Data

(60) Provisional application No. 61/450,916, filed on Mar. 9, 2011, provisional application No. 61/534,931, filed on Sep. 15, 2011.

(51) Int. Cl.
*G02B 1/111* (2015.01)
*B32B 27/20* (2006.01)
(Continued)

(52) U.S. Cl.
CPC ............. *G02B 1/111* (2013.01); *B32B 5/145* (2013.01); *B32B 27/20* (2013.01); *B32B 27/205* (2013.01);
(Continued)

(58) Field of Classification Search
CPC ............ Y10T 428/249986; Y10T 428/249981
See application file for complete search history.

(56) References Cited

U.S. PATENT DOCUMENTS

| 3,646,085 A | 2/1972 | Bartlett |
| 3,810,874 A | 5/1974 | Mitsch |

(Continued)

FOREIGN PATENT DOCUMENTS

| JP | 2002-79600 | 3/2002 |
| JP | 2010-195859 | 9/2010 |

(Continued)

OTHER PUBLICATIONS

Wicth et al., "Nanoporous Films with Low Refractive Index for Large-Surface Broad-Band Antireflective Coatings"; Macromolecular Materials and Engineering 2010, 295, 628-636.
(Continued)

*Primary Examiner* — Hai Vo
(74) *Attorney, Agent, or Firm* — Carolyn A. Fischer

(57) ABSTRACT

Antireflective films are described comprising a light transmissive substrate and a low refractive index layer disposed on the light transmissive substrate. The low refractive index layer comprises the reaction product of polymerizable resin composition comprising at least 20 wt-% fumed silica. In one embodiment, the polymerizable resin is ethylenically unsaturated. In a favored embodiment, the low refractive index layer increases in porosity from the light transmissive substrate interface to an opposing porous surface.

16 Claims, 5 Drawing Sheets

(51) Int. Cl.
 *B32B 27/30* (2006.01)
 *B32B 5/14* (2006.01)

(52) U.S. Cl.
 CPC ............ *B32B 27/304* (2013.01); *B32B 27/308* (2013.01); *B32B 2307/412* (2013.01); *G02B 2207/107* (2013.01); *Y10T 428/249961* (2015.04); *Y10T 428/249986* (2015.04); *Y10T 428/249991* (2015.04); *Y10T 428/249992* (2015.04)

(56) References Cited

U.S. PATENT DOCUMENTS

| | | | |
|---|---|---|---|
| 4,262,072 | A | 4/1981 | Wendling |
| 4,816,333 | A | 3/1989 | Lange |
| 5,677,050 | A | 10/1997 | Bilkadi |
| 6,277,485 | B1 | 8/2001 | Invie |
| 6,376,590 | B2 | 4/2002 | Kolb |
| 7,101,618 | B2 | 9/2006 | Coggio |
| 7,241,437 | B2 | 7/2007 | Davidson |
| 7,718,264 | B2 | 5/2010 | Klun |
| 7,887,889 | B2 | 2/2011 | David |
| 2003/0012936 | A1 | 1/2003 | Draheim |
| 2004/0184150 | A1 | 9/2004 | Johnson |
| 2006/0147702 | A1 | 7/2006 | Pokorny |
| 2006/0148950 | A1 | 7/2006 | Davidson |
| 2006/0172128 | A1 | 8/2006 | Shinohara |
| 2006/0188664 | A1 | 8/2006 | Ando |
| 2006/0216524 | A1 | 9/2006 | Klun |
| 2006/0269733 | A1 | 11/2006 | Mizuno |
| 2007/0042173 | A1 | 2/2007 | Nagaoka |
| 2007/0062445 | A1 | 3/2007 | Kodou |
| 2007/0286994 | A1 | 12/2007 | Walker |
| 2007/0287093 | A1* | 12/2007 | Jing et al. .................. 430/270.1 |
| 2008/0032052 | A1 | 2/2008 | Kourtakis |
| 2008/0124539 | A1* | 5/2008 | Kawai et al. ................. 428/331 |
| 2010/0003501 | A1 | 1/2010 | Liu |
| 2012/0200931 | A1* | 8/2012 | Haag et al. .................... 359/599 |
| 2012/0201977 | A1* | 8/2012 | Haag et al. .................... 427/595 |

FOREIGN PATENT DOCUMENTS

| | | |
|---|---|---|
| WO | WO 2006/073856 | 7/2006 |
| WO | WO 2006/073867 | 7/2006 |
| WO | WO 2007/053772 | 5/2007 |
| WO | WO 2007/146686 | 12/2007 |
| WO | WO 2009/035874 | 3/2009 |
| WO | WO 2010/121019 | 4/2010 |
| WO | WO 2010/078071 | 7/2010 |
| WO | WO 2010/078346 | 7/2010 |
| WO | WO 2010/079495 | 7/2010 |
| WO | WO 2010/120468 | 10/2010 |
| WO | WO 2010/120845 | 10/2010 |
| WO | WO 2010/120864 | 10/2010 |
| WO | WO 2010/120871 | 10/2010 |
| WO | WO 2010/120971 | 10/2010 |
| WO | WO 2010/123528 | 10/2010 |
| WO | WO 2011/090717 | 7/2011 |
| WO | WO 2012/054320 | 4/2012 |

OTHER PUBLICATIONS

Cabot, Aqueous Dispersion for Injet Media, CAB-O-Sperse®__PG002, 1 page, (obtained from the internet prior to the Mar. 9, 2011 filing date).
Cabot, Aqueous Dispersion for Injet Media, CAB-O-Sperse®__PG022, 1 page, (obtained from the internet prior to the Mar. 9, 2011 filing date).
Cabot, Untreated Fumed Silica, CAB-O__SIL__M-5, Product Form, 2004, 2 pages.
WACKER__Silicones, Product Overview, HDK®__Pyrogenic-Silica, 12 pages, (obtained from the internet prior to the Mar. 9, 2011 filing date).
CAB-O-SIL H-5, Product Form, Powder, Apr. 2004, 2 pgs.
International Search Report PCT/US2012/025573 Jul. 30, 2012; 7 pgs.

* cited by examiner

ANTIREFLECTIVE FILM COMPRISING LARGE PARTICLE SIZE FUMED SILICA

BACKGROUND

Various antireflective ("AR") polymer films have been described. AR films are often constructed of alternating high and low refractive index ("RI") polymer layers of the correct optical thickness. With regards to visible light, this thickness is on the order of one-quarter of the wavelength of the light to be reflected. The human eye is most sensitive to light around 550 nm. Therefore it is desirable to design the low and high index coating thicknesses in a manner that minimizes the amount of reflected light in this optical range.

Antireflection films have been described that comprise nanoporous layers coated on transparent substrates. (See JP 2002-79600 and *Nanoporous Films with Low Refractive Index for Large-Surface Broad-Band Antireflection Coatings*, Macromolecular Materials and Engineering, 2010, 295, 628-636)

Although various antireflective coating and films have been described, industry would find advantage in alternative antireflective coating and films, particularly those amenable to reduced cost and/or exhibiting improved properties.

SUMMARY

In one embodiment, an antireflective film is described comprising a light transmissive substrate and a low refractive index layer disposed on the light transmissive substrate at an interface wherein the low refractive index layer comprises the reaction product of a polymerizable resin composition comprising at least 50 wt-% of low index particles inclusive of at least 20 wt-% fumed silica and the low refractive index layer increases in porosity from the light transmissive substrate interface to an opposing porous surface.

In some embodiments, the light transmissive substrate further comprises another layer between the substrate and low refractive index layer, such as a primer and/or a hardcoat layer.

Further, the low refractive index layer may optionally comprise a surface layer on a major surface opposing the light transmissive substrate.

In another embodiment, an antireflective film is described comprising a light transmissive substrate and a low refractive index layer disposed on the light transmissive substrate wherein the low refractive index layer comprises the reaction product of an ethylenically unsaturated polymerizable resin comprising at least 20 wt-% fumed silica.

Also described is a method of making an antireflective coated substrate comprising providing a coating composition comprising an ethylenically unsaturated polymerizable resin composition comprising at least 50 wt-% of low index particles inclusive of at least 20 wt-% fumed silica; applying the coating composition to a substrate; and curing the coating composition.

BRIEF DESCRIPTION OF THE DRAWINGS

FIG. 4b depicts the normalized electron transmission as a function of thickness of the antireflective film of FIG. 4a.

FIG. 7b depicts the normalized electron transmission as a function of thickness of the comparative film of FIG. 7a.

DETAILED DESCRIPTION

As used herein, the term "polymerizable composition" refers to a composition that includes monomer, oligomers, or mixtures thereof that are capable of undergoing a polymerization reaction to form a polymeric material.

As used herein, the term "free-radically polymerizable" refers to monomers, oligomers, and polymers having functional groups that participate in crosslinking reactions upon exposure to a suitable source of free radicals. Free-radically polymerizable groups include for example (meth)acryl groups, —SH, epoxy, or vinyl, or mixtures thereof. The free-radically polymerizable group may be halogenated with for example fluorine such as in the case of —COCF═CH$_2$.

As used herein, the term "primary particle size" refers to the size of a non-associated silica particle. X-ray Diffraction (XRD) is typically used to measure the primary particle size using the method described herein.

As used herein, the term "aggregation" or "aggregated" refers to a strong association between primary particles. For example, the primary particles may be chemically bound to one another. The breakdown of aggregates into smaller particles (e.g., primary particles) is generally difficult to achieve. Similarly, the term "non-aggregated" refers to primary particles that are free of strong associations with other primary particles.

As used herein, "wt-%" refers to the sum of the solid components with the exception of solvent.

Presently described are antireflective films comprising a light transmissive substrate and a low refractive index layer disposed on the light transmissive substrate.

The light transmissive substrate has a higher refractive index than the low refractive index layer, thereby serving the function of a high refractive index layer. Thus, the antireflective film described typically lacks a high refractive index layer applied to the low refractive index layer.

The low refractive index layer comprises the reaction product of a polymerizable resin comprising fumed silica.

Fumed silica, also known as pyrogenic silica, is made from flame pyrolysis of silicon tetrachloride or from quartz sand vaporized in a 3000° C. electric arc. Fumed silica consists of microscopic droplets of amorphous silica fused into (e.g. branched) three-dimensional primary particles that aggregate into larger particles. Since the aggregates do not typically break down, the average particle size of fumed silica is the average particle size of the aggregates.

Figure 1:
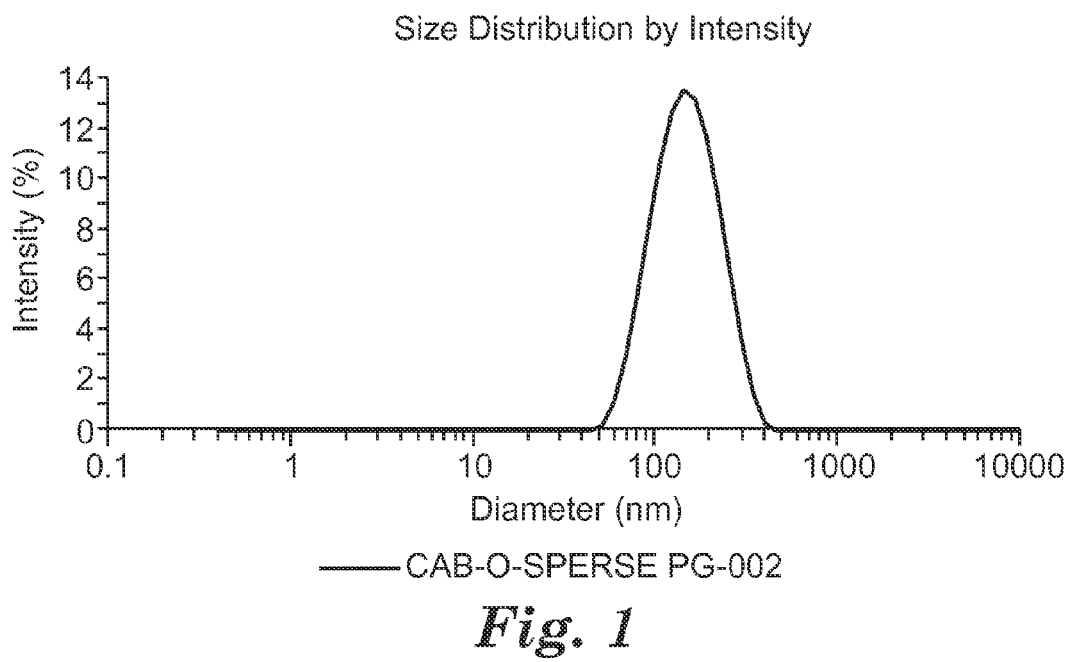
FIGS. 1-3 depict the particle size distribution of illustrative aggregate fumed silica as measured by dynamic light scattering.
Figure 2:
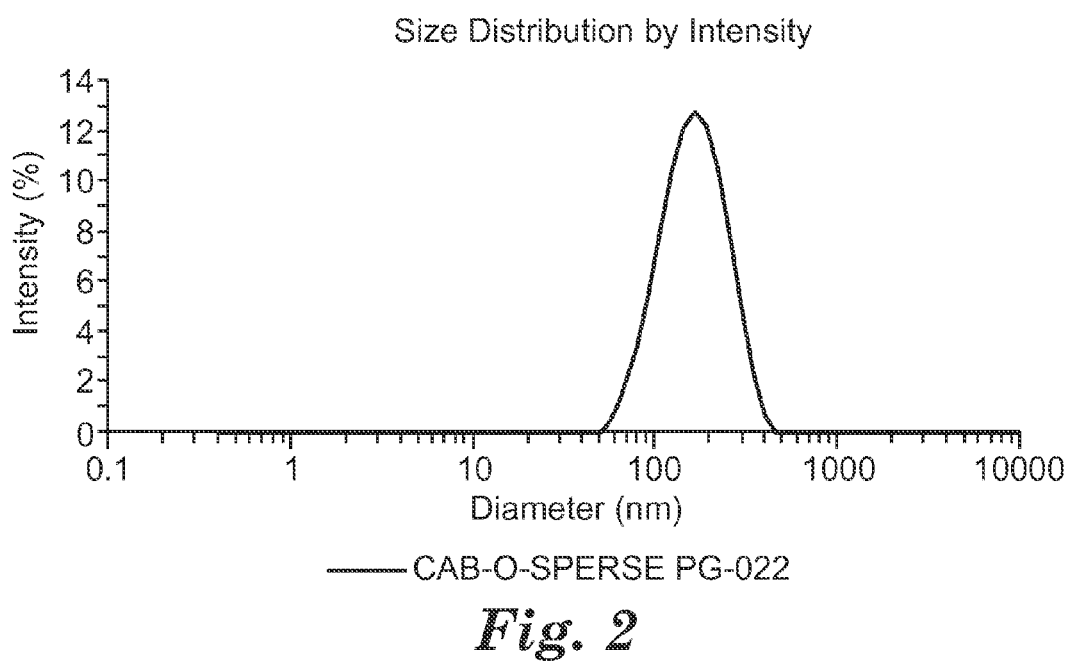
Figure 3:
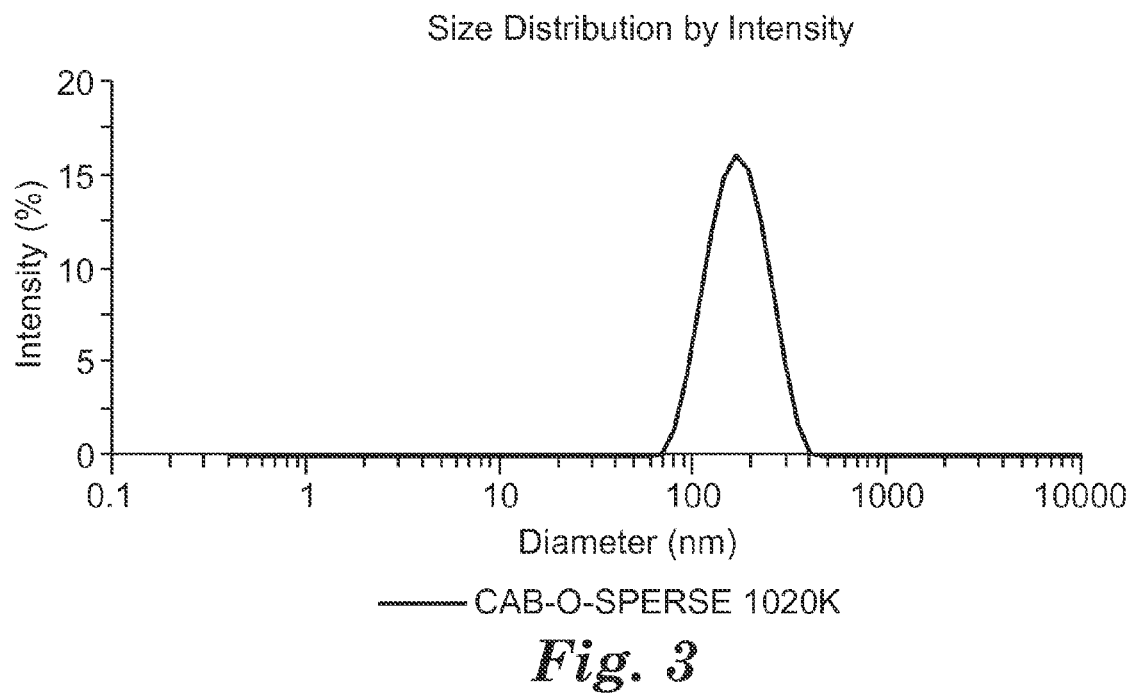

Fumed silica is commercially available from various global producers including Evonik, under the trade designation "Aerosil"; Cabot under the trade designation "Cab-O-Sil", and Wacker Chemie-Dow Corning. Fumed silica, having an average aggregate particle size greater than 100 nm is available under the trade designations "Cab-O-Sperse 1020K", "Cab-O-Sperse 1015A", "Cab-O-Sperse PG-022", and "Cab-O-Sperse PG-002". The intensity-weighted particle distribution is depicted in FIGS. 1-3. The surface area of such fumed silica is typically at least 50 m$^2$/g, or 75 m$^2$/g, or 100 m$^2$/g. In some embodiments, the surface area of the fumed silica is no greater than 400 m$^2$/g, or 350 m$^2$/g, or 300 m$^2$/g, or 275 m$^2$/g, or 250 m$^2$/g. The fumed silica aggregates preferably comprise silica having a primary particle size no greater than 10 nm, or 9 nm, or 8 nm, or 7 nm, or 6 nm, or 5 nm.

As is evident by FIGS. 1-3, the fumed silica of the polymerizable resin composition of the low index layer has an intensity-average aggregate particle size, as measured by dynamic light scattering according to the test method described in the forthcoming examples, of at least 100 nm, or at least 105 nm, or at least 110 nm. The upper limit of the intensity-average particle size is surmised to be no greater than the thickness of the cured coating, i.e. about 500 nm. The intensity-average aggregate particle size of the fumed silica is typically no greater than 300 nm, or 250 nm or 200 nm. In some embodiments, the intensity-average aggregate particle size of the fumed silica is no greater than 150 nm, or 140 nm, or 135 nm.

The low index layer described herein comprises the reaction product of a polymerizable resin comprising at least 20 wt-% of fumed silica. The cost of fumed silica is considerably less expensive than other low index particles such as hollow nanosilica. The cost of fumed silica is also less expensive than fluorinated monomers and oligomers which have also been utilized to lower the refractive index of a coating. Hence, increasing the concentration of the fumed silica is amenable to reducing the cost of the low index layer. Hence, the low index layer typically comprises at least 25 wt-%, or 30 wt-%, or 35 wt-%, or 40 wt-%, or 45 wt-% of fumed silica (e.g. having a z-average aggregate particle size of greater than 100 nm). When the fumed silica is the sole source of silica in the low index coating composition, the concentration of fumed silica is at least 50 wt-%, or 55 wt-%, or 60 wt-%, or 65 wt-%, or 70 wt-% of the total low index composition. When the total concentration of (e.g. fumed) silica exceeds 75 wt-% or 80 wt-%, the durability may be compromised.

Figure 4A:
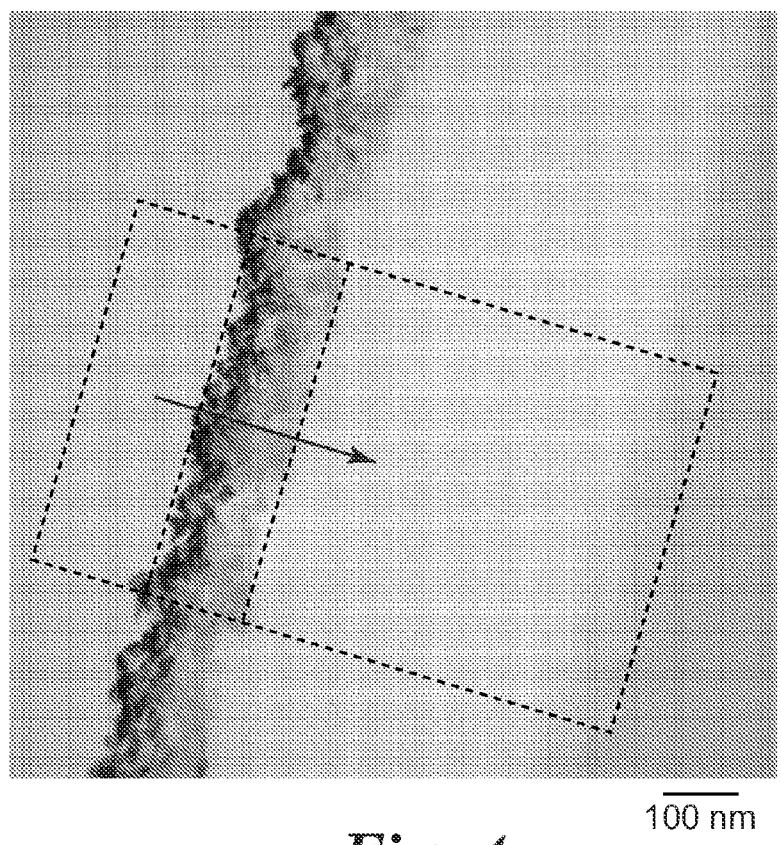
FIG. 4a depicts a transmission electron microscopy cross-section of an illustrative antireflective film comprising a porous low refractive index layer disposed on a light transmissive substrate.
Figure 4B:
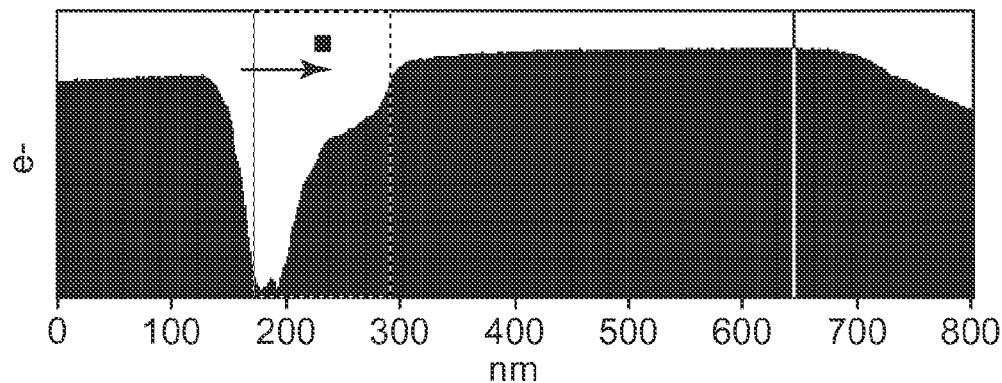

Using high concentrations of porous low refractive index particles, such as fumed silica, is also amenable to providing a porous low refractive index layer. FIGS. 4A and 4B depict the porous nature of a favored low index layer, as described herein.

FIG. 4A depicts a transmission electron microscopy cross-section of an illustrative antireflective film deposited with a Au/Pd layer. Au/Pd coating is very electron opaque, and appears dark. Note that it extends from the outer surface of the AR film (on the left) into the interior of the film, implying that there is high porosity on the top surface in the AR film that has enabled the Au/Pd to penetrate beyond the outer surface (even go through more than ⅓ thickness of the antireflective film). In addition, the Au/Pd density gradient decreases toward the substrate interface. FIG. 4B depicts the electron transmission as a function of thickness of the antireflective film deposited with a Au/Pd layer. The thickness of about 300-700 nm is the electron transmission of the uncoated control area where the AR coating happened to delaminate from the transparent film substrates; whereas the thickness less than 150 nm is the electron transmission of no specimen area. The middle area is the AR coating deposited with a Au/Pd layer. It is evident that the low refractive index layer increases in porosity from the light transmissive substrate interface to the opposing porous surface. Alternatively, the low refractive index layer decreases in porosity from the exposed outer surface to the interface with the light transmissive substrate. The porosity at the exposed outer surface is surmised to be at least 40% and 50%, and typically no greater than 65%. In favored embodiments, the porosity is surmised to be at least 40%. Thus, the refractive index of the outermost layer approaches the refractive index of air. The refractive index at this outermost layer typically ranges from about 1.15 to 1.25. However, as the porosity decreases in the direction approaching the light transmissive substrate, the refractive index of the low index layer approaches that of the polymerizable resin composition, typically ranging from about 1.33 to 1.4 or 1.5. Hence, the low refractive index layer can be characterized as having a refractive index ranging from 1.15 to 1.4 or 1.5.

Figure 5:
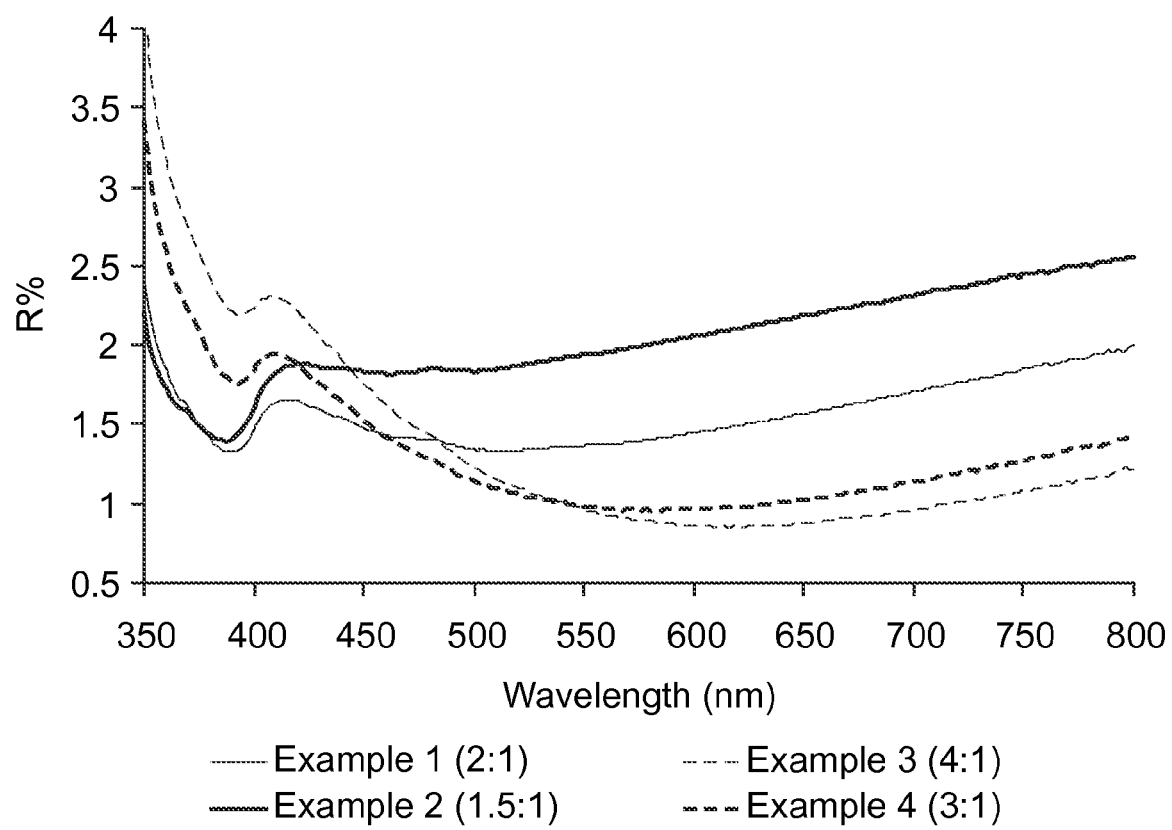
FIG. 5 depicts the percent reflectance of four illustrative antireflective films.
Figure 6:
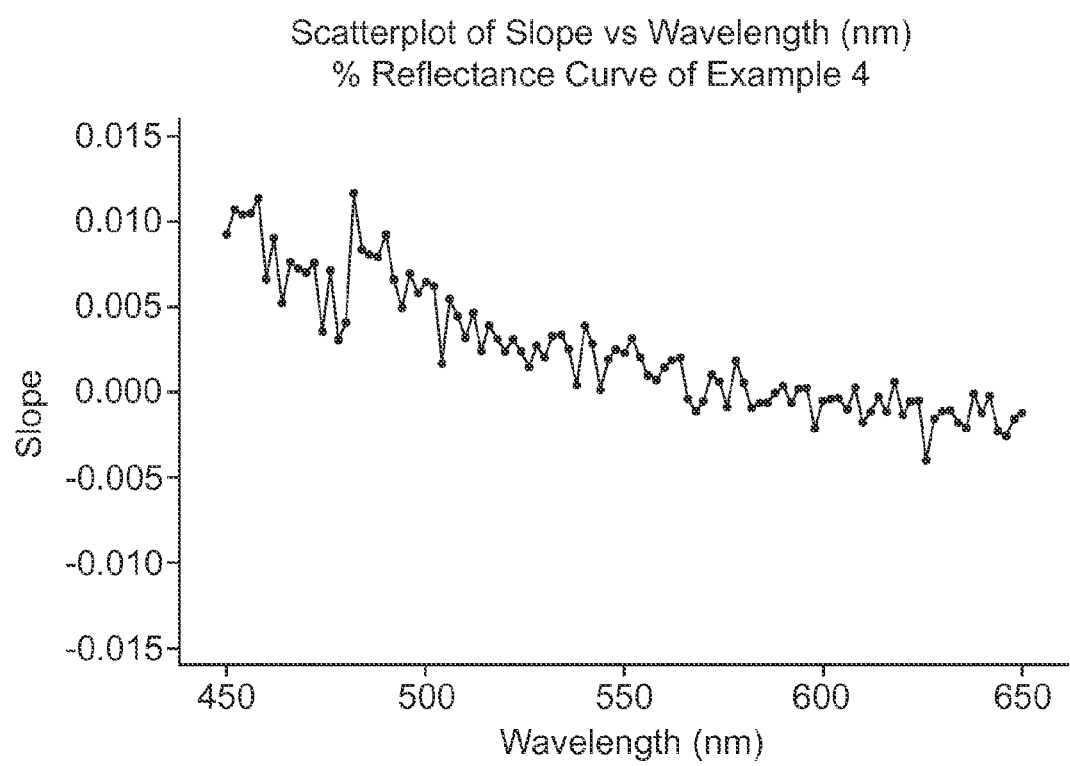
FIG. 6 depicts the slope at increments of 2 nm of the reflectance curve of an illustrative antireflective film of FIG. 5.

The refractive index gradient of the low index layer as well as the roughness of the outermost layer is amenable to reducing interference fringing. With reference to FIGS. 5 and 6, the reflectance curves of favored antireflective films described herein are relatively flat and exhibit very little oscillation such as is generally the case with interference fringing.

One way to express reflectance that is indicative of the "flatness" of the reflectance curves is average reflectance for a wavelength range of interest. The antireflective films described herein preferably exhibit an average reflectance of no greater than 2% for the entire wavelength range from 450 nm to 650 nm. Preferred antireflective films exhibit an average reflectance of no greater than 2.0%, or 1.5% or 1.0% for the entire wavelength range from 450 nm to 650 nm.

The low interference fringing can be expressed with respect to the absolute value of the maximum slope of the reflectance curve at 2 nm increments. The antireflective films described herein preferably exhibit an absolute value of the maximum slope of the reflectance curve at 2 nm increments of no greater than 0.05 for the wavelength range from 450 nm to 650 nm. Preferred antireflective films exhibit an absolute value of the maximum slope of the reflectance curve at 2 nm increments of no greater than 0.03 or 0.02 for the wavelength range from 450 nm to 650 nm.

The antireflective films described herein can also be characterized with respect to a minimum reflectance for a wavelength in the range from 450 nm to 650 nm. In favored embodiments, the minimum reflectance is no greater than 2.0%, or 1.5% or 1.0%. The minimum preferably occurs near 550 nm, such as from 500 nm to 600 nm.

With reference to FIGS. 1-3, for favored embodiments wherein the fumed silica is the major or sole source of silica, the low refractive index layer comprises typically less than 10 wt-%, or 5 wt-%, or 2 wt-% or 1 wt-% of fumed silica having an intensity-average aggregate particle size of 50 nm or less. Further, the low refractive index layer typically comprises less than 30 wt-% of fumed silica having an intensity-average aggregate particle size of 70 nm or less.

In another embodiment, the polymerizable resin of the low index layer comprises fumed silica in combination with other low index particles. In this embodiment, the polymerizable resin comprises at least 50 wt-% of low index particles includes of at least 20 wt-% fumed silica. Various low index particles have been described in the art, such as hollow silica particles, metal oxides, metal nitrides, and metal halides (e.g. fluorides such as magnesium fluoride, and lithium fluoride). However, the inclusion of such low index particles typically increases the cost of the low refractive index coating.

For porous low index layers, the other low index particles are also sufficiently porous as to provide the same porous structure as fumed silica. However, for less porous or non-porous low refractive index layers, the polymerizable resin composition may comprise (e.g. non-aggregated) colloidal silica having an average particle size less than 100 nm. In this embodiment, the concentration of low index particles, such as silica, having an average particle size less than 100 nm may be substantially greater. For example, the concentration may be at least 30 wt-%, or 40 wt-%, 50 wt-%, or 60 wt-%.

The low index particles inclusive of the fumed silica particles are typically surface modified with a surface treatment agent. Surface treatment of the metal oxide particles can provide, for example, improved dispersion in the polymerizable resin, altered surface properties, enhanced particle-resin interactions, and/or reactivity. In some embodiments, the surface treatment stabilizes the particles so that the particles are well dispersed in the binder, resulting in a substantially more homogeneous composition. The incorporation of surface modified inorganic particles can be tailored, for example, to enhance covalent bonding of the particles to the binder, thereby providing a more durable and more homogeneous polymer/particle network.

Preferred surface treatments are determined, in part, by the chemical nature of the metal oxide surface. Silanes are preferred for silica and other siliceous fillers. In the case of silanes, it may be preferred to react the silanes with the particle surface before incorporation into the binder. The required amount of surface modifier is dependent upon several factors such as, for example, particle size, particle type, modifier molecular weight, and/or modifier type. The silane modifier can have (free-radically polymerizable) reactive groups that form covalent bonds between particles and the binder, such as, for example, carboxy, alcohol, isocynanate, acryloxy, epoxy, thiol or amines. Conversely, the silane modifier can have non-reactive groups, such as, for example, alkyl, alkoxy, phenyl, phenyloxy, polyethers, or mixtures thereof. Such non-reactive groups may modify the surface of the coatings to improve, for example, soil and dirt resistance or to improve static dissipation. It may sometimes be desirable to incorporate a mixture of functional and non-function groups on the surface of the particles to obtain a combination of these desirable features.

In some embodiments, at least one (meth)acryl silane is employed as the copolymerizable surface treatment. Suitable (meth)acryl silanes include (meth)acryloyl alkoxy silanes such as 3-(methacryloyloxy)propyltrimethoxysilane, 3-acryloyloxypropyltrimethoxysilane, 3-(methacryloyloxy)propylmethyldimethoxysilane, 3-(acryloyloxypropyl)methyldimethoxysilane, 3-(methacryloyloxy)propyldimethylmethoxysilane, and 3-(acryloyloxypropyl)dimethylmethoxysilane. Of these, the (meth)acryl silanes tend to provide better flexibility in comparison to the acryl silanes.

The surface modification of the particles can be accomplished in a variety known ways, such as described in previously cited Published U.S. Patent Application No. 2006/0148950 and U.S. Pat. No. 6,376,590.

The fumed silica and optional other low index particles are dispersed in a polymerizable resin composition. In favored embodiments, the polymerizable resin composition is an ethylenically unsaturated polymerizable resin, such as a free-radically polymerizable composition comprising one or more (meth)acryl monomers and/or oligomers. A preferred (meth)acryl group is (meth)acrylate.

The polymerizable resin of the low refractive index layer typically comprises at least one (e.g. non-fluorinated) monomer or oligomer having at least two free-radically polymerizable groups, such as a crosslinker having at least three free-radically polymerizable groups, as previously described. The (meth)acrylate groups may be pendant groups, yet are typically present as terminal groups. The low refractive index layer comprises at least 5 wt-%, or 10 wt-%, or 15 wt-% and generally no greater than about 40 wt-% or 50 wt-% solids of at least one (e.g. non-fluorinated) monomer or oligomer having at least two free-radically polymerizable groups, such as crosslinker.

Various difunctional (meth)acrylate monomers are known in the art, including for example 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, cyclohexanedimethanol diacrylate, diethylene glycol diacrylate, dipropylene glycol diacrylate, neopentyl glycol diacrylate, polyethylene glycol diacrylate, (Mn=200 g/mole, 400 g/mole, 600 g/mole), propoxylated neopentyl glycol diacrylate, tetraethylene glycol diacrylate, tricyclodecanedimethanol diacrylate, triethylene glycol diacrylate, and tripropylene glycol diacrylate.

Suitable free-radically polymerizable crosslinkers include for example trimethylolpropane triacrylate (commercially available from Sartomer Company, Exton, Pa. under the trade designation "SR351"), ethoxylated trimethylolpropane triacrylate (commercially available from Sartomer Company, Exton, Pa. under the trade designation "SR454"), pentaerythritol tetraacrylate, pentaerythritol triacrylate (commercially available from Sartomer under the trade designation "SR444"), dipentaerythritol pentaacrylate (commercially available from Sartomer under the trade designation "SR399"), ethoxylated pentaerythritol tetraacrylate, ethoxylated pentaerythritol triacrylate (from Sartomer under the trade designation "SR494"), dipentaerythritol hexaacrylate, and tris(2-hydroxy ethyl) isocyanurate triacrylate (from Sartomer under the trade designation "SR368"). In some aspects, a hydantoin moiety-containing multi-(meth)acrylates compound, such as described in U.S. Pat. No. 4,262,072 (Wendling et al.) is employed.

The polymerizable resin (inclusive of the low index particles) may also include mono(meth)acrylate monomers at concentrations up to about 15 wt-%. Such monomer may be employed as a reactive diluent.

The polymerizable resin of the low refractive index layer may optionally comprise fluorinated monomers to provide low surface energy. The concentration of fluorinated monomer is typically relatively low, ranging from at least 0.25 wt-%, or 0.5 wt-%, or 1 wt-% to no greater than 5 wt-%, 6 wt-%, 7 wt-%, 8 wt-%, 9 wt-%, or 10 wt-% of the total polymerizable resin composition (inclusive of the low index particles).

The surface energy of the low index coating composition can be characterized by various methods such as contact angle and ink repellency. The static contact angle with water of the cured low refractive index layer is typically at least 80°. More preferably, the contact angle is at least 90° and most preferably at least 100°. Alternatively, or in addition thereto, the advancing contact angle with hexadecane is at least 50° and more preferably at least 60°. Low surface energy is amenable to anti-soiling and stain repellent properties as well as rendering the exposed surface easy to clean.

Various fluorinated mono- and multi-functional free-radically polymerizable monomers, oligomers, and polymers may be employed in the preparation of the low refractive index layer and fluoro(meth)acrylate polymer (e.g. intermediate) described herein. Such materials generally comprises free-radically polymerizable moieties in combination with (per)fluoropolyether moieties, (per)fluoroalkyl moieties, and (per)fluoroalkylene moieties. In one embodiment, the polymerizable composition of the low refractive index layer comprises at least one multi-functional component having a high fluorine content, (e.g. of at least 25 wt-%). Other fluorinated components, having a fluorine content less than 25 wt-%, can also be employed and may be useful in compatibilizing fluorinated materials in the reaction mixture.

One illustrative high fluorine containing material is a (e.g. perfluoropolyether) acrylate oligomer reported by the supplier to have a refractive index of 1.341 commercially available from Sartomer under the trade designation "CN4000". In view of the low refractive index, this material is believed to have a fluorine content of at least about 50 wt-%. Based on NMR analysis, CN4000 has a molecular weight (Mn) of about 1300 g/mole.

Other commercially available low refractive index perfluoropolyether compounds include a perfluoropolyether caprolactone diacrylate compound, available from Cytonix Corporation, Beltsville, Md., under the trade designation "Fluor N 1939A" and perfluoropolyether glycol diacrylate, also available from Cytonix Corporation under the trade designation "Fluor N 1970A"

Other highly fluorinated perfluoropolyether (meth)acrylates from can be prepared by reaction of a commercially available perfluoropolyether compounds (such as available from Solvay Solexis under the trade designation "Fomblin Zdol 2000") with acryloyl chloride using methods described in Example 15 of U.S. Pat. No. 3,810,874.

In some embodiments, the perfluoropolyether (meth)acrylate compound(s) may be characterized as perfluoropolyether urethane compounds. Such materials generally include at least one polymerizable (e.g. terminal) (meth)acrylate moiety and at least one (optionally repeating) unit including a (per)fluoropolyether group bonded by means of a linking group having a valency of at least two to a urethane or urea linkage. The urethane or urea linkage structure is typically —NHC(O)X— wherein X is O, S or NR; and R is H or an alkyl group having 1 to 4 carbon. The perfluoropolyether moiety is preferably a HFPO—(poly(hexafluoropropyleneoxide)) moiety. Various suitable compounds are described in U.S. Patent Publication No. 2006/0216524 and U.S. Pat. No. 7,718,264. One exemplary high fluorine perfluoropolyether urethane (meth)acrylate is HFPO—C(O)NHC$_2$H$_4$OC(O)NHC$_2$H$_4$OC(O)C(CH$_3$)=CH$_2$, wherein HFPO is F(CF(CF$_3$)CF$_2$O)$_a$CF(CF$_3$)— and "a" averages 2 to 15.

At least one free-radical initiator is typically utilized for the preparation of the polymerizable low index coating compositions. Useful free-radical thermal initiators include, for example, azo, peroxide, persulfate, and redox initiators, and combinations thereof. Useful free-radical photoinitiators include, for example, those known as useful in the UV cure of acrylate polymers. In addition, other additives may be added to the final composition. These include but are not limited to resinous flow aids, photostabilizers, high boiling point solvents, and other compatibilizers well known to those of skill in the art. In some embodiments, the polymerizable composition comprises a photoinitiator, such as commercially available under the trade designations "Irgacure 127" and "Irgacure 184".

The polymerizable compositions can be formed by dissolving the free-radically polymerizable composition (inclusive of the low index particles) in a compatible organic solvent. For embodiments wherein the low refractive index layer is porous, the concentration of the polymerizable composition in the organic solvent is preferably no greater than 5 wt-% solids, or 4 wt-% solids, or 3 wt-% solids. The concentration is typically at least 2 wt-% solids. For embodiments, wherein the low refractive index layer has lower porosity or no porosity, the concentration of polymerizable resin in the organic solvent may be higher, ranging up to 10 or 15 wt-% solids.

A single organic solvent or a blend of solvents can be employed. Depending on the free-radically polymerizable materials employed, suitable solvents include alcohols such as isopropyl alcohol (IPA), ethanol, and 1-methoxy-2-propanol; ketones such as methyl ethyl ketone (MEK), methyl isobutyl ketone (MIBK), diisobutyl ketone (DIBK); cyclohexanone, or acetone; aromatic hydrocarbons such as toluene; isophorone; butyrolactone; N-methylpyrrolidone; tetrahydrofuran; esters such as lactates and acetates, including propylene glycol monomethyl ether acetate such as commercially available from 3M under the trade designation "3M Scotchcal Thinner CGS 10" ("CGS 10"), 2-butoxyethyl acetate such as commercially available from 3M under the trade designation "3M Scotchcal Thinner CGS50" ("CGS50"), diethylene glycol ethyl ether acetate (DE acetate), ethylene glycol butyl ether acetate (EB acetate), dipropylene glycol monomethyl ether acetate (DPMA), iso-alkyl esters such as isohexyl acetate, isoheptyl acetate, isooctyl acetate, isononyl acetate, isodecyl acetate, isododecyl acetate, isotridecyl acetate or other iso-alkyl esters; combinations of these and the like.

Although various fluorinated solvents could be employed, in one aspect compatible low refractive index coating compositions are prepared that are free of fluorinated solvents. Compatible coating compositions are clear, rather than hazy. Compatible coatings are substantially free of visual defects. Visual defects that may be observed when incompatible coating are employed include but are not limited to haze, pock marks, fisheyes, mottle, lumps or substantial waviness, or other visual indicators known to one of ordinary skill in the art in the optics and coating fields.

The method of forming an antireflective coating on an optical display or an antireflective film for use on an optical display may include providing a light transmissible substrate and providing the low index layer described herein coupled to the (higher refractive index) light transmissive substrate. The low index layer may be provided by applying a layer of a low refractive index coating composition diluted in an organic solvent as previously described onto a light transmissive substrate (e.g. a film or component of an article) and irradiating with a sufficient ultraviolet radiation to crosslink. This is typically a preferred method for forming a low index layer that increases in porosity from the substrate interface to the opposing porous surface. However, for other embodiments, such as when the low refractive index layer is non-porous or uniformly porous from the substrate interface to the opposing surface, other methods can be utilized. For example, the low refractive index coating may be applied to a release liner, at least partially cured, and transfer coated onto the light transmissive layer using a thermal or radiation-induced transfer. Suitable transfer methods are described in Published U.S. Application No. 2006/0147614.

The low refractive index composition is typically applied as a single layer directly to a (e.g. display surface or film) substrate using conventional film application techniques.

Thin films can be applied using a variety of techniques, including dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others. Many types of die coaters are described in the literature such as by Edward Cohen and Edgar Gutoff, *Modern Coating and Drying Technology*, VCH Publishers, NY 1992, ISBN 3-527-28246-7 and Gutoff and Cohen, *Coating and Drying Defects: Troubleshooting Operating Problems*, Wiley Interscience, NY ISBN 0-471-59810-0.

The thickness of the cured low refractive index layer typically ranges from about 100 nm to no greater than about 500 nm. In some embodiments, the thickness of the low refractive index layer is no greater than 400 nm or 300 nm.

Although it is usually convenient for the substrate to be in the form of a roll of continuous web, the coatings may be applied to individual sheets.

The low refractive index coating is dried in an oven to remove the solvent and then cured for example by exposure to ultraviolet radiation using an H-bulb or other lamp at a desired wavelength, preferably in an inert atmosphere (less than 50 parts per million oxygen). The reaction mechanism causes the free-radically polymerizable materials to crosslink.

The light transmissive substrate may comprise or consist of any of a wide variety of non-polymeric materials, such as glass, or various thermoplastic or crosslinked polymeric materials, such as polyethylene terephthalate (PET), (e.g. bisphenol A) polycarbonate, triacetyl cellulose (TAC), poly (methyl methacrylate), and polyolefins such as biaxially oriented polypropylene which are commonly used in various optical devices. Further, the substrate may comprise a hybrid material, having both organic and inorganic components.

Various light transmissive optical films suitable for use as the film substrate are known including but not limited to, multilayer optical films, microstructured films such as retroreflective sheeting and brightness enhancing films, (e.g. reflective or absorbing) polarizing films, diffusive films, as well as (e.g. biaxial) retarder films and compensator films such as described in U.S. Patent Application Publication No. 2004/0184150, Jan. 29, 2004.

The substrate, as well as the antireflective film, typically have a transmission of at least 90% or 91%, or 92%. In some favored embodiments, the transmission is at least 93%, or 94%, or 95%, or 96%, or 97%.

The substrate, as well as the antireflective film, typically have a haze of less than 2% and in some embodiments less than 1%.

For most applications, the substrate thickness is preferably less than about 0.5 mm, and more preferably about 20 microns to about 200 microns. Self-supporting polymeric films are preferred. The polymeric material can be formed into a film using conventional filmmaking techniques such as by extrusion and optional uniaxial or biaxial orientation of the extruded film. The substrate can be treated to improve adhesion between the substrate and the adjacent layer, e.g., chemical treatment, corona treatment such as air or nitrogen corona, plasma, flame, or actinic radiation. If desired, an optional tie layer or primer can be applied to the substrate to increase the interlayer adhesion.

The antireflective film may comprise other layers.

In some embodiments, a hardcoat is applied to the substrate prior to applying the low refractive index layer. The presence of the hardcoat can improve the durability of the antireflective film. The hardcoat typically has a thickness of at least 0.5 microns, preferably at least 1 microns, and more preferably at least 2 microns. The thickness of the hardcoat is typically no greater than 10 microns and more typically no greater than 5 microns.

Various hardcoat compositions are known, such as described in U.S. Pat. No. 7,101,618; WO2007/146686; and US2010/0003501; each incorporated herein by reference. When present, the hardcoat composition is generally selected such that it is "index matched" with the light transmissive substrate, i.e. the hardcoat and light transmissive substrate have a refractive index that differs by no greater than +/−0.02.

In some embodiments, such as embodiments further comprising a hardcoat, the antireflective films described herein are durable. In one aspect, the durable antireflective films resist scratching after repeated contact with an abrasive material such as steel wool. The presence of significant scratching can increase the haze of the antireflective film. In one embodiment, the antireflective film has a haze of less than 1.0% after 10, 20, or 30 wipes with steel wool using a 3.2 cm mandrel and a mass of 200 g or 300 g, according to the Steel Wool Durability Test described in US2010/0003501.

In another embodiment, the low refractive index layer further comprises a surface layer on a major surface opposing the light transmissive substrate. Thus, the surface layer is typically exposed to air. The purpose of this layer can be to modify the surface energy characteristics of the air-low refractive index layer interface, to improve mechanical durability, and/or improve soil resistance. Low refractive index surface layer materials typically comprise silicone- or fluorine-containing polymers. The layer is generally applied extremely thin so as to not fill in or disrupt the pore structure of the low refractive index layer, and thereby preserve optical properties. If the surface layer is applied too thick, it will typically fill in the pore structure of the low refractive index layer, raise the refractive index of the low refractive index layer, and increase reflectivity leading to lower antireflective performance (i.e. high reflectance).

Technologies that can be used to apply a surface layer to the low refractive index layer include vapor-phase deposition of fluoropolymers such as by plasma deposition (e.g. as described in U.S. Pat. No. 7,887,889); in-situ polymerization of fluoromonomers such as difluorocarbene (e.g. as described in WO 2011 090717); self-assembling monolayer and ultrathin film chemistries such as perfluoropolyether-substituted alkoxysilanes (e.g. as described in U.S. Pat. No. 6,277, 485); and vapor-phase deposition and curing of ultrathin films of silicone-substituted or fluorinated acrylates (e.g. as described in WO 2011/090717). The thickness of the surface layer is generally no greater than 100 nm, and preferably no greater than 50 nm, so as to cause no or minimal disruption of the porous structure of the low refractive index layer.

Various permanent and removable grade adhesive compositions may be provided on the opposite side of the film substrate. For embodiments that employ pressure sensitive adhesive, the antireflective film article typically include a removable release liner. During application to a display surface, the release liner is removed so the antireflective film article can be adhered to the display surface.

Suitable adhesive compositions include (e.g. hydrogenated) block copolymers such as those commercially available from Kraton Polymers, Westhollow, Tex. under the trade designation "Kraton G-1657", as well as other (e.g. similar) thermoplastic rubbers. Other exemplary adhesives include acrylic-based, urethane-based, silicone-based and epoxy-based adhesives. Preferred adhesives are of sufficient optical quality and light stability such that the adhesive does not yellow with time or upon weather exposure so as to degrade the viewing quality of the optical display. The adhesive can be applied using a variety of known coating techniques such as transfer coating, knife coating, spin coating, die coating and the like. Exemplary adhesives are described in U.S. Patent Publication No. 2003/0012936. Several of such adhesives are commercially available from 3M Company, St. Paul, Minn. under the trade designations 8141, 8142, and 8161.

Antireflective films and method are further illustrated by the following non-limiting examples.

Aggregate Particle Size of Fumed Silica

The intensity-average particle size was determined by dynamic light scattering using a Malvern Zetasizer Nano ZS particle size analyzer (available from Malvern Instruments Inc., Southborough, Mass.). Samples of aqueous fumed silica were diluted from concentrations of approximately 20 wt % solids to less than about 1 wt % by adding a drop or two of fumed silica dispersion to a few milliliters of de-ionized water in a glass or plastic cuvette. The cuvette was then covered and shaken to ensure uniform dispersion. Prior to starting data acquisition the temperature of the sample chamber was allowed to equilibrate at 25° C. The software used for calculating the particle size was Zetasizer Software version 5.03. The following parameters were used in the calculations: refractive index of water equal to 1.333, viscosity of water equal to 0.8872 centipoise, and refractive index of the fumed silica equal to 1.45. Particle size measurements were carried out with the PG-002, PG-022 and 1020K fumed silica dispersions previously described. Particle size distributions for these are shown in FIGS. 1, 2 and 3.

Preparation of Surface Treated Fumed Silica

1. Surface treated PG002 A 100 g sample of a fumed silica dispersion (available as CAB-O-SPERSE PG002 from Cabot Corporation, Billerica Mass.) was charged to a 500 ml three-neck flask equipped with a condenser, stir bar, stir plate, temperature controller, and heating mantle. PG002 is an aggregated fumed silica with an average particle diameter of about 200 nm. A premix of 3.08 g of the silane A174 (97% 3-methacryloxypropyltrimethoxysilane, available from Alfa Aesar, Ward Hill Mass.) and 100 g of 1-methoxy-2-propanol were added to this dispersion and stirred. The A174/1-methoxy-2-propanol premix beaker was rinsed with two aliquots of 25 g each of 1-methoxy-2-propanol, and the rinses were added to the batch. The batch was then heated to 80° C. and held for approximately 16 hours with stirring. The resulting mixture was a hazy translucent dispersion with low viscosity. The batch was then cooled to room temperature and transferred to a 500 ml one-neck distillation flask. Water was removed from the batch by alternate vacuum distillation using a rotary evaporator and addition of 160 g of 1-methoxy-2-propanol. The batch was then further concentrated by vacuum distillation to result in 78.4 g of a hazy translucent dispersion with low viscosity having 26.8 wt % solids.

2. Surface treated PG022 A 200 g sample of a fumed silica dispersion (available as CAB-O-SPERSE PG022 from Cabot Corporation, Billerica Mass.) was charged to a 1 L three-neck flask equipped with a condenser, stir bar, stir plate, temperature controller, and heating mantle. PG022 is an aggregated fumed silica with an average particle diameter of about 150 nm. A premix of 6.16 g of the silane A174 (97% 3-methacryloxypropyltrimethoxysilane, available from Alfa Aesar, Ward Hill Mass.) and 100 g of 1-methoxy-2-propanol were added to this dispersion and stirred. The A174/1-methoxy-2-propanol premix beaker was rinsed with two aliquots of 25 g each of 1-methoxy-2-propanol, and the rinses were added to the batch. The batch was then heated to 80° C. and held for approximately 16 hours with stirring. The resulting mixture was a hazy translucent dispersion with low viscosity. The batch was then cooled to room temperature and transferred to a 1 L one-neck distillation flask. Water was removed from the batch by alternate vacuum distillation using a rotary evaporator and addition of 200 g of 1-methoxy-2-propanol. The batch was then further concentrated by vacuum distillation to result in 78.4 g of a hazy translucent dispersion with low viscosity having 25.1 wt % solids.

3. Surface treated Cab-O-Sphere 1020K A 3000 ml 3-neck flask equipped with a stir bar, stir plate, condenser, heating mantle and thermocouple/temperature controller was charged with 1000 g of Cab-O-Sphere 1020K (a 20 wt % solids dispersion of fumed silica available from Cabot Corp.). To this dispersion, 1400 g of 1-methoxy-2-propanol was added with stirring. Next 30.75 g of 97% 3-(methacryloxypropyl)trimethoxysilane was added to a 100 g poly beaker. The 3-(methacryloxypropyl)trimethoxysilane was added to the batch with stirring. The beaker containing the 3-(methacryloxypropyl)trimethoxysilane was rinsed with aliquots of 1-methoxy-2-propanol totaling 100 grams. The rinses were added to the batch. At this point the batch was an opaque white, viscous dispersion. The batch was heated to 80° C. and held for approximately 16 hours. The resulting mixture was a viscous, opaque white slurry. The batch was then cooled to room temperature. The water was removed from the batch by alternate vacuum distillation and addition of 900 g 1-methoxy-2-propanol. The batch was concentrated by vacuum distillation to result in a very viscous, opaque dispersion with 27.7% wt % solids.

Preparation of Coating Formulations with PG002 Fumed Silica

An antireflective coating solution was prepared as follows. Surface treated PG002 fumed silica was mixed with resin binder SR399 (available from Sartomer Company, Exton Pa.), photoinitiator Irgacure 127 (available from Ciba Specialty Chemicals, Tarrytown N.Y.), isopropyl alcohol and ethyl acetate. This resulted in a coating with a 2 to 1 fumed silica to resin binder ratio (by weight). The proportions of components are specified in the following Table 1:

TABLE 1

| Materials | | Percent solids as supplied | Amount (grams) |
|---|---|---|---|
| A-174 treated | Fumed silica | 24.14% | 15 |
| PG002 | A-174 modifier | 2.68% | |
| SR399 | | 100 | 2.01 |
| Isopropyl alcohol | | 0 | 150 |
| Ethyl Acetate | | 0 | 34 |
| Irgacure 127 | | 100 | 0.12 |
| Total | | | 201 |

Additional antireflective coatings were prepared similarly with 1.5 to 1, 2.5 to 1, 3 to 1, and 4 to 1 ratios, by weight, of fumed silica to resin.

Application of PG002 Coatings to TAC Films

The formulations prepared as described above were then coated on 5 mil (127 micron) TAC (cellulose triacetate) substrates. (TAC films are available, for example, from Island Pyrochemical Industries, Mineola N.Y.). Each of the four coating formulations described above was applied to a TAC substrate using a #3 wire-wound rod (available from R.D. Specialties, Webster N.Y.). The resulting films were then dried in air for 15 minutes and cured using a Light Hammer 6 ultraviolet curing system (from Fusion UV Systems, Gaithersburg Md.) equipped with an H-bulb operating under a nitrogen atmosphere at 100% lamp power and at a line speed of 25 feet per minute. The thickness of the coating after curing was approximately 200 nm.

Optical Measurements of Coated Films

Reflectance measurements of the coated TAC films were conducted using a Perkin Elmer 950 UV/Vis Spectrophotometer. Measurements were taken every 2 nm across the band from 350 nm to 800 nm. Measurement samples for front-side reflectance were prepared by applying black vinyl tape (available as Yamato Black Vinyl Tape #200-38 from Yamato International Corp., Woodhaven Mich.) to the backside of the coated film sample. The tape was laminated to the backside of the film using a roller to insure that no air bubbles were trapped between the black tape and the film sample. The sample was then placed so that the coated side (opposite the taped side) was placed against the aperture of the integrating sphere detector of the spectrometer. Minimum reflectance (R) across the spectrum from 350 nm to 800 nm, expressed as a percentage, is shown for each film in Table 2. Spectral reflectance curves for all four coatings are shown in FIG. 5. Table 2 also provides transmission (T) and haze (H) values; these were measured using a Haze-Gard Plus haze meter (available from BYK-Gardner, Columbia Md.). Refractive index (RI) for each coating is also shown in Table 2. Refractive index of the coatings was determined as follows. Because accurate measurement of refractive index required a thicker coating than that used for antireflection, the coating solutions as described above were each coated on 2 mil (50.8 micron) PET film using a #20 wire-wound rod, then dried in air and cured as described above, resulting in films with a dried coating of thickness of approximately 1.5 microns. Refractive indices of these films were measured using a Metricon Model 2010 Prism Coupler (available from Metricon Corp., Pennington N.J.). The percent reflectance is depicts in FIG. 5. Other optical measurements are reported in the following table:

TABLE 2

| | PG002-based coatings on TAC | | | | | | |
|---|---|---|---|---|---|---|---|
| Surface treated fumed silica to resin ratio* | Fumed Silica to organic binder ratio* | T% | H% | RI | R% (Minimum) | R% Average (450 nm to 650 nm) | R% Average Std dev |
| Example 1 1.5:1 | 1.17:1 | 96.5 | 0.97 | 1.308 | 1.832 at 502 nm | 1.958 | 0.483 |
| Example 2 2:1 | 1.5:1 | 96.9 | 0.66 | 1.282 | 1.331 at 518 nm | 1.415 | 0.07 |
| Example 3 3:1 | 2.08:1 | 97.4 | 0.44 | 1.255 | 0.956 at 580 nm | 1.082 | 0.156 |
| Example 4 4:1 | 2.57:1 | 97.1 | 0.31 | 1.239 | 0.863 at 600 nm | 1.084 | 0.116 |

*weight ratio of solids of the cured composition

The flatness of the reflectance curve for the 3:1 fumed silica to resin coating was estimated by computing slopes over 2 nm intervals. The resulting graph of the slopes of the reflectance curve is shown from 450 nm to 650 nm in FIG. 6. The slope with greatest absolute value was 0.012; it occurred at 482 nm. The calculation was repeated for coatings with 1.5:1, 2:1, and 4:1 fumed silica to resin ratios; the slopes of greatest absolute value were, respectively, 0.0070, 0.006 and 0.015.

Application of PG002 Coatings to PET Films

Four of the coating formulations previously described (2:1, 2.5:1, 3:1 and 4:1 fumed silica to resin ratios) were coated on a 5 mil (127 micron) Melinex 618 primed PET film (available from Dupont Teijin Films, Hopewell Va.) using a #3 wire-wound rod (available from R.D. Specialties, Webster N.Y.). The resulting films were then dried in air for 15 minutes and then cured using the Light Hammer 6 UV system described above at 75% lamp power and a line speed of 30 feet per minute. Reflectance measurements were made as described above, and minimum reflectance (R) values for each film (expressed as a percentage) are provided in Table 3. Transmission (T) and haze (H) measurements were also made as described previously and are also provided in Table 3.

TABLE 3

| | PG002-based coatings on PET | | | | | |
|---|---|---|---|---|---|---|
| Surface treated fumed silica to resin ratio* | Fumed Silica to binder ratio* | T% | H% | R% (Minimum) | R% Average (450~650 nm) | R% Average std dev |
| Example 5 2:1 | 1.5:1 | 94.8 | 0.83 | 1.7726 at 506 nm | 1.963 | 0.1724 |
| Example 6 2.5:1 | 1.8:1 | 94.6 | 0.77 | 1.6086 at 510 nm | 1.782 | 0.1552 |
| Example 7 3:1 | 2.08:1 | 95 | 0.67 | 1.5616 at 518 nm | 1.699 | 0.1192 |
| Example 8 4:1 | 2.57:1 | 95.1 | 0.76 | 1.658 at 578 nm | 1.85 | 00.224 |

*weight ratio of solids of the cured composition

Preparation of Coating Formulation with PG022 Fumed Silica for Example 9

An antireflective coating solution was prepared in a manner analogous to the PG002 coating formulations described above. The following ingredients were combined by mixing and then stirred: 10 g of the surface treated PG022 (25.12% solids by weight), 1.0 g of SR399 resin, 0.075 of the photoinitiator Irgacure 127, 30 g of 1-methoxy-2-propanol and 100 g of isopropyl alcohol. The resulting coating solution had a 2.5 to 1 ratio of fumed silica to resin.

Preparation of Coating Formulation with PG002 Fumed Silica for Example 10

An antireflective coating solution was prepared in a manner analogous to Example 9. The following ingredients were combined by mixing and then stirred: 10 g of the surface treated PG002 (26.82% solids by weight), 1.073 g of SR399 resin, 0.075 of the photoinitiator Irgacure 127, 36 g of 1-methoxy-2-propanol and 103 g of isopropyl alcohol. The resulting coating solution had a 2.5 to 1 ratio of fumed silica to resin.

Preparation of Coating Formulation with 1020K Fumed Silica for Example 11

An antireflective coating solution was prepared in a manner analogous to Example 9. The following ingredients were combined by mixing and then stirred: 10 g of the surface treated Cab-O-Sperse 1020K (27.7% solids by weight), 1.108 g of SR399 resin, 0.08 of the photoinitiator Irgacure 127, 30 g of ethyl acetate and 88 g of isopropyl alcohol. The resulting coating solution had a 2.5 to 1 ratio of fumed silica to resin.

Application of Coatings to TAC Films for Examples 9-11

The formulations prepared as described above were then coated on a 5 mil (127 micron) TAC (cellulose triacetate) substrate using a #3 wire-wound rod. The resulting films were then dried in air for 15 minutes and cured using a Light Hammer 6 ultraviolet curing system equipped with an H-bulb operating under a nitrogen atmosphere at 75% lamp power and at a line speed of 30 feet per minute. The thickness of the coatings after curing was approximately 200 nm.

Reflectance, haze and transmission measurements were then made with the films as described above. The results are shown in Table 4.

TABLE 4

Coatings on TAC

| Surface-treated fumed silica | T % | H % | R % (min) | R % (average, 450–650 nm) | R % (std dev) |
|---|---|---|---|---|---|
| Example 9 PG022 | 96.8 | 0.46 | 1.17 | 1.311 | 0.104 |
| Example 10 PG002 | 96.8 | 0.34 | 0.96 | 1.274 | 0.072 |
| Example 11 1020K | 95.5 | 9.60 | 2.70 | 3.100 | 0.25 |

Example 11 was repeated using Cab-O-Sphere 1015A (ammonium counter ions) instead of Cab-O-Sphere 1020K (potassium as counter ions). Reflectance measurements were made as described above. The R % (min) is 1.68, and R % (average)=1.887, and the haze was 2.5%.

Examples 13-14: Preparation of Coating Formulation with PG002 Fumed Silica and Fluorinated Acrylate Oligomer Two coating solutions were prepared with surface treated PG002 as described above with a 2.5 to 1 ratio of fumed silica to resin binder SR399, except that either 1% or 10% by weight of CN4000 fluorinated acrylate oligomer (available from Sartomer Co., Exton Pa.) was added to the coating solution. Each solution was then coated on a polycarbonate substrate using a #4 wire-wound rod (available from R&D Specialties, Webster N.Y.). The resulting films were then dried in an oven at 80° C. for one minute, then cured using the Light Hammer 6 UV system described above at 75% lamp power and a line speed of 30 feet per minute. Reflectance measurements were made as described above. The coating with 1% by weight CN4000 had a reflectance of 0.74% at 595 nm and the coating with 10% by weight CN4000 had a reflectance of 0.93% at 560 nm.

Comparative Example with A-174 treated colloidal silica and 10 wt-% solids fumed silica A 100 g sample of a 12 nm colloidal silica dispersion (available as Nalco®DVSZN006, 34.6% wt dispersed in water available from Nalco, Naperville, Ill.) was charged to a 500 mL three-neck flask equipped with a condenser, stir bar, stir plate, temperature controller, and heating mantle. 150 g of 1-methoxy-2-propanol and 8.87 g of silane A174 (97% 3-Methacryloxypropyltrimethoxysilane (available from Alfa Aesar, Ward Hill Mass.) were added to this dispersion and stirred. The A174/1-methoxy-2-propanol premix beaker was rinsed with two aliquots of 15 g each of 1-methoxy-2-propanol, and the rinses were added to the batch. The batch was then heated to 80° C. and held for approximately 16 hours with stirring. The resulting mixture was a hazy translucent dispersion with low viscosity. The batch was then cooled to room temperature and transferred to a 1 L one-neck distillation flask. Water was removed from the batch by alternate vacuum distillation using a rotary evaporator and addition of 100 g of 1-methoxy-2-propanol. The batch was then further concentrated by vacuum distillation to result in 302 g of a hazy translucent dispersion with low viscosity having 40.0% wt solids.

A coating formulation was then prepared by mixing 1.8 g of A-174 modified PG022 (25.1% wt in 1-methoxy-2-propanol), 6.91 g of A-174 modified 12 nm silica (40% wt in 1-methoxy-2-propanol), 1.2857 g of SR399, 0.1 g of Irgacure 127 together, then 110 g of isopropyl alcohol and 30 g of 2-butanone were added. After shaking, it formed a homogenous coating solution. The coating formulation was then applied onto a 5-mil TAC film using a #3 wire-wound rod (obtained from RD Specialties, Webster, N.Y.), respectively. The resulting film was then dried in air for 2 minutes, and then cured using one pass through a Fusion UV-Systems Inc. Light-Hammer 6 UV processor equipped with an H-bulb, operating under nitrogen atmosphere at 100% lamp power at a line speed of 30 feet/min.

Reflectance measurements of the coated TAC films were conducted as previously described. The average reflectance (450650 nm) was measured to be 4.4668%, while the average reflectance (450-650 nm) of the fumed silica formulation was 1.311 (Example 9). The only difference between the two samples was the colloidal 12 nm silica vs. fumed silica.

Figure 7A:
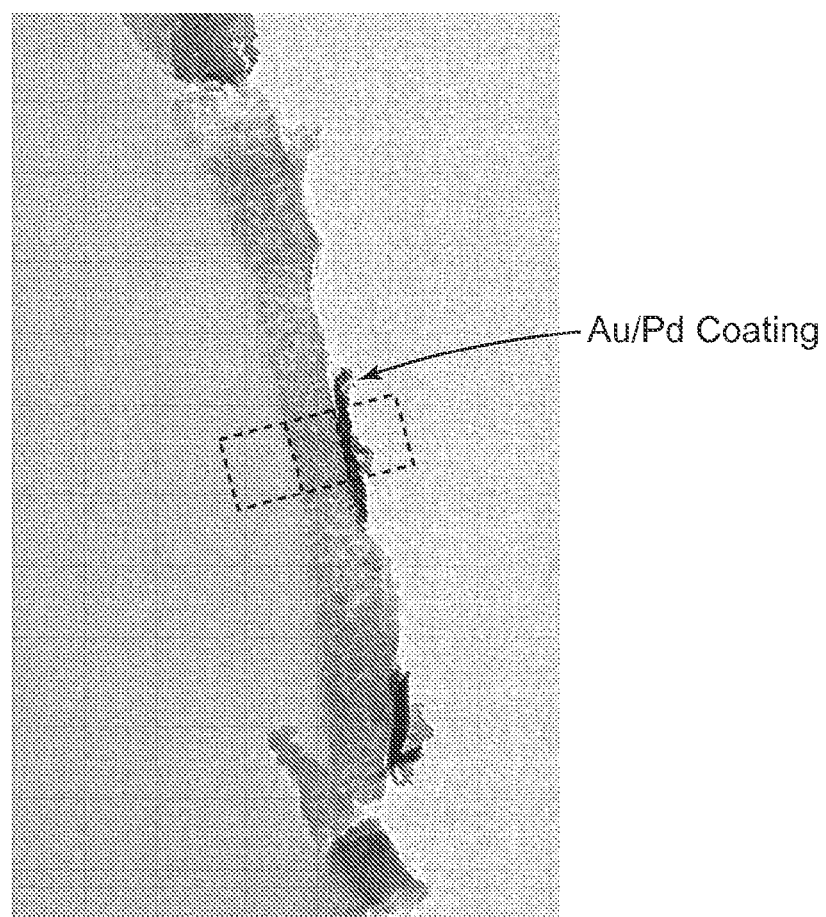
FIG. 7a depicts a transmission electron microscopy cross-section of an illustrative comparative film comprising a low refractive index layer disposed on a light transmissive substrate.
Figure 7B:
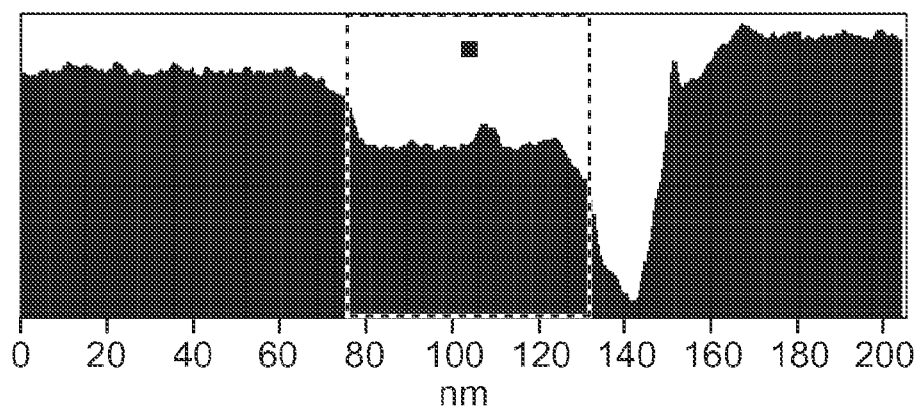

FIG. 7a depicts a transmission electron microscopy cross-section of the comparative thin coating deposited with a Au/Pd layer. Au/Pd coating is very electron opaque, and appears dark. Note that it does not appear to extend from the outer surface of the comparative thin coating (on the right in this image) into the interior of the film, implying that there is no significant porosity in the film. The Au/Pd layer does not adhere well to the coating, only partial Au/Pd coatings are present on the surface. This is another indication that the comparative thin coating has little or no porosity. FIG. 7b depicts the electron transmission as a function of thickness of the thin film deposited with a Au/Pd layer. The thickness of about 0-80 nm is the electron transmission of the transparent film substrate; whereas the thickness from 150 nm to 200 nm is the electron transmission of no specimen area. The middle area is the thin coating deposited with a Au/Pd layer. It is clear that the electron transmission across the thin film is constant, but is more electron opaque than the substrate due the high loading of colloidal silica particles. The electron transmission drops quickly when the scan crosses the Au/Pd layer. It is evident that the thin coating does not change in porosity.

Preparation of Surface Treated Zirconium Oxide for Examples 15-29 (ZrO2/A174)

An aqueous solution consisting of 20.4 pounds (9.3 kg) of zirconium oxide nanoparticles at 40.8% solids in water were added to a 10 gallon (37.8 L) reactor. Diameters of the nanoparticles ranged from 7 to 13 nm, and the mean diameter was 10 nm. The zirconium oxide nanoparticles were made as described in U.S. Pat. No. 7,241,437 (Davidson et al.). Next 12.9 pounds (5.9 kg) of additional water and 33.3 pounds (15.1 kg) of 2-methoxy-1-propanol were added to the reactor with stirring. Then 2.5 pounds (1.1 kg) of 3-(trimethoxysilyl) propylmethacrylate (A174) were added slowly to the reactor with stirring. Finally, 0.021 lbs (9.9 g) of a 5% solution of the polymerization inhibitor Prostab S198 (5% in water, available from BASF Corp., Florham Park N.J.) were added to the reactor with stirring. The solution was stirred overnight (18 hours) at 80 degrees C.

The reaction was heated under vacuum (24-40 torr) and the methoxypropanol/water azeotrope was distilled into a holding tank while slowly adding 70.5 lbs (32 kg) of methoxypropanol. Next 0.4 lbs (181 g) of 30% ammonium hydroxide was added to the reaction mixture, and then the reaction was concentrated to 59.2% solids by distilling off methoxypropanol. The final solution was filtered through a 0.5 micron filter. The result was a solution containing 59.2% surface modified zirconium oxide in 2-methoxy-1-propanol.

Preparation of Hard Coat Solutions for Examples 15-29

Two different hard coating formulations were prepared by mixing A-174 modified zirconium oxide, resin binders, Irgacure 184, and solvent together. The mixtures were stirred for 10 minutes. The coating compositions are listed in Table 5 for the first hard coat solution (HC-1) and Table 6 for the second (HC-2). Solution HC-1 had a 3:7 ratio of ZrO$_2$/A174 to resin; solution HC-2 had a 7:3 ratio of ZrO$_2$/A174 to resin. The percent solids for each was about 50%. The refractive index of HC-1 was 1.58 (which matched the refractive index of polycarbonate and TAC films).

TABLE 5

Hardcoat Composition-1

| Materials | Weight of solids (grams) | % solids | Amount (grams) |
|---|---|---|---|
| ZrO$_2$/A174 | 30 | 59% | 51.72 |
| SR399 | 20 | 100% | 20.00 |
| CN2253* | 30 | 100% | 30.00 |
| SR601** | 20 | 100% | 20.00 |
| Irgacure 184 | 2 | 100% | 2.00 |
| MEK | | 0 | 70 |
| Methoxy propanol | | | 10.3 |
| Total | 102 | Total Solution | 204.02 |
| | | Solution % solids | 49.99% |

*polyester acrylate oligomer, available from Sartomer Co
**ethoxylated bisphenol A diacrylate, available from Sartomer Co

TABLE 6

HC-2

| Materials | Weight of solids (grams) | % solids | Amount (grams) |
|---|---|---|---|
| ZrO2/A174 | 70 | 59% | 118.64 |
| SR399 | 15 | 100% | 15.00 |
| SR601 | 15 | 100% | 15.00 |

TABLE 6-continued

HC-2

| Materials | Weight of solids (grams) | % solids | Amount (grams) |
|---|---|---|---|
| Irgacure 184 | 2 | 100% | 2.00 |
| MEK | | 0 | 30 |
| Total | 102 | Total Solution | 204.04 |
| | | Solution % solids | 49.99% |

Preparation of Coating Solution with PG002 Fumed Silica for Examples 15-23

An antireflective coating solution was prepared as follows. Surface treated PG002 fumed silica as previously described was mixed with resin binder SR399, photoinitiator Irgacure 127, the fluorinated acrylate oligomer CN4000 (available from Sartomer Company), and solvent according to the proportions shown in Table 7. The components were mixed for 10 minutes under stirring. The resulting solution had a ratio of fumed silica to SR399 resin of 2.5:1 and was 3% solids.

TABLE 7

| Materials | % solids | Amount (grams) |
|---|---|---|
| A-174 modified PG022 | 27.9% | 24.4 |
| SR399 | 100 | 2.7 |
| Ethyl Acetate | 0 | 303 |
| CN4000 | 3% | 16.7 |
| Irgacure 127 | 100 | 0.4 |
| Total | | 347.2 |

Application of Coatings to Films (Examples 15-23)

The hard coat solutions HC-1 and HC-2 were then applied to 5 mil (127 micron) polycarbonate (PC), 2 mil (51 micron) TAC and 4 mil (102 micron) polyethylene terephthalate (PET) films using a #10 wire-wound rod (available from R.D. Specialties, Webster N.Y.) in the combinations shown in Table 8. The resulting films were then dried in an oven at 100 degrees C. for 1 minute. Then they were cured using a Light Hammer 6 ultraviolet curing system as described previously at either 50% or 100% lamp power as shown in Table 8. Curing was done in one pass at 30 feet per minute (9.1 m/minute). Nitrogen purge during curing was either on or off as also noted in the table. After curing the hardcoat had a (calculated) thickness of 4-5 microns, based on the wet coating thickness and percent solids of the coating.

татLE 8

| | Substrate | Hard Coat | UV power, H bulb | Nitrogen |
|---|---|---|---|---|
| Example 15 | PC | HC-1 | 50% | off |
| Example 16 | TAC | HC-1 | 50% | off |
| Example 17 | PET | HC-2 | 50% | off |
| Example 18 | PC | HC-1 | 100% | off |
| Example 19 | TAC | HC-1 | 100% | off |
| Example 20 | PET | HC-2 | 100% | off |
| Example 21 | PC | HC-1 | 50% | on |
| Example 22 | TAC | HC-1 | 50% | on |
| Example 23 | PET | HC-2 | 50% | on |

Next the PG002 coating solution described above was applied on each of the previously described hard coat surfaces. The coating was done using a #3 wire-wound rod. The resulting films were dried in an oven at 80 degrees C. for 1 minute and then cured with a Light Hammer 6 ultraviolet processor as before under a nitrogen atmosphere at 100% lamp power with one pass at a line speed of 20 feet per minute (6.1 m/minute).

Reflectance (R) of the two-layer films was then measured as previously described. Minimum reflectance (expressed as a percentage), the wavelength at which the minimum occurs, and the average reflectance (as a percentage) across the band from 450 to 650 nm are shown in Table 9. Plots of reflectance versus wavelength are provided as FIG. 8.

TABLE 9

|  | Minimum reflectance | Wavelength at minimum | Average reflectance |
|---|---|---|---|
| Example 15 | 1.22 | 540 | 1.34 |
| Example 16 | 1.08 | 620 | 1.40 |
| Example 17 | 1.39 | 560 | 1.40 |
| Example 18 | 1.04 | 560 | 1.21 |
| Example 19 | 1.05 | 585 | 1.28 |
| Example 20 | 1.33 | 590 | 1.56 |
| Example 21 | 1.06 | 590 | 1.31 |
| Example 22 | 1.04 | 595 | 1.28 |
| Example 23 | 1.26 | 580 | 1.56 |

Haze (H), transmission (T) and clarity (C) were also measured for each film and are shown in Table 10. In addition, the durability of the film surfaces were assessed using a steel wool test with Grade #0000 steel wool pads with 10 rubs at 200 grams of pressure using a circular steel wool pad 1.25 inches in diameter. A complete description of the steel wool durability test can be found in US2010/0003501.

Results are shown in Table 10. The best steel wool test results occurred for Examples 15, 16 and 17 where the hard coat layer had a lower-powered cure.

TABLE 10

|  | % H | % T | % C | Steel wool test |
|---|---|---|---|---|
| Example 15 | 0.42 | 94.4 | 99.8 | Very light scratching |
| Example 16 | 0.46 | 95.8 | 99.7 | No scratching |
| Example 17 | 0.77 | 93.8 | 100 | Light scratching |
| Example 18 | 0.52 | 94.7 | 99.6 | Medium scratching |
| Example 19 | 0.55 | 95.6 | 99.8 | Medium scratching |
| Example 20 | 0.7 | 93.6 | 100 | Heavy scratching |
| Example 21 | 0.6 | 94.6 | 99.8 | Heavy scratching |
| Example 22 | 0.55 | 96 | 99 | Heavy scratching |
| Example 23 | 0.72 | 93 | 99.7 | Very heavy scratching |

Preparation of Coating Solution with PG002 Fumed Silica for Examples 24-29

An antireflective coating solution was prepared as follows. Surface treated PG002 fumed silica was mixed with resin binder SR399, photoinitiator Irgacure 127, and solvent according to the proportions shown in Table 11. The components were mixed for 10 minutes under stirring. The resulting solution had a ratio of fumed silica to SR399 resin of 7:3 and was 3% solids.

TABLE 11

| Materials | % solids | Amount (grams) |
|---|---|---|
| A-174 modified PG022 | 27.9% | 25.1 |
| SR399 | 100 | 3 |
| Ethyl Acetate | 0 | 318 |
| Irgacure 127 | 100 | 0.4 |
| Total |  | 347.2 |

Preparation of Surface Energy-Control Layer Coating for Examples 24-29

Surface layer coatings were prepared by mixing hexafluoropropylene oxide (HFPO) silane (prepared as described in U.S. Pat. No. 3,646,085) with the fluoropolymer Novec EGC-1720. A coating consisting of 1% by weight of solids was prepared according to the proportions shown in Table 12 below. Then a 0.5% wt coating was prepared by mixing the ingredients of the solution just described with the solvent Novec 7100 according to the proportions shown in Table 12. (Both Novec EGC-1750 and Novec 7100 are available from 3M Company.) After combining, the mixtures were stirred for 10 minutes.

TABLE 12

|  | 1% wt solids | 0.5% wt solids |
|---|---|---|
| HFPO silane | 0.9 g | 0.9 g |
| Novec EGC-1720 | 100 g | 100 g |
| Novec7100 | 0 g | 100 g |

Application of Coatings to Films (Examples 24-29)

The hard coat solution HC-1 was then applied to six different 5 mil (127 micron) polycarbonate (PC) films using a #10 wire-wound rod. The resulting films were then dried in an oven at 100 degrees C. for 1 minute. Then they were cured using a Light Hammer 6 ultraviolet curing system as described previously at 50% lamp power. Curing was done in one pass at 30 feet per minute (9.1 m/minute) without nitrogen purging.

Next the PG002 fumed silica coating solution described above was applied to the six films over the hard coat using a #3 wire-wound rod. The resulting films were then dried in an oven at 80 degrees C. for 1 minute and then cured using the Light Hammer 6 system in a nitrogen atmosphere at 100% lamp power in one pass at a line speed of 20 feet per minute (6.1 m/minute).

Then the surface energy-control layer coating was applied over the PG002 fumed silica coating layer on five of the six different films. The sixth film was not coated with a sealing layer. Different coating rods were used as indicated in Table 13 below. The resulting films were cured in an oven at 90 degrees C. for 30 minutes. After curing the surface layer had a (calculated) thickness of 5-15 nanometers, based on the wet coating thickness and percent solids of the coating.

TABLE 13

|  | % solids of Surface Layer Coating Solution | Coating Rod |
|---|---|---|
| Example 24 | No surface layer coating | N/A |
| Example 25 | 0.50% | #3 |
| Example 26 | 0.50% | #4 |
| Example 27 | 0.50% | #5 |
| Example 28 | 1% | #3 |
| Example 29 | 1% | #5 |

Reflectance (R) of the six films was then measured as previously described. Minimum reflectance (expressed as a percentage), the wavelength at which the minimum occurs, and the average reflectance (as a percentage) across the band from 450 to 650 nm are shown in Table 14. Plots of reflectance versus wavelength are provided as FIG. 9.

TABLE 14

| | Minimum reflectance | Wavelength at minimum | Average reflectance |
|---|---|---|---|
| Example 24 | 1.3 | 560 | 1.46 |
| Example 25 | 1.41 | 615 | 1.60 |
| Example 26 | 1.42 | 635 | 1.68 |
| Example 27 | 1.56 | 625 | 1.86 |
| Example 28 | 1.61 | 635 | 2.00 |
| Example 29 | 2.21 | 590 | 2.38 |

Haze (H), transmission (T) and clarity (T) were also measured for each film and are shown in Table 15. In addition, the durability of the film surfaces were assessed using a steel wool test with Grade #0000 steel wool pads with 10 rubs at 200 grams, and 30 rubs at 300 grams of pressure using a circular steel wool pad 1.25 inches in diameter.

TABLE 15

| | % H | % T | % C | Steel wool test (200 g/10 rub) | Steel wool test (300 g/30 rub) |
|---|---|---|---|---|---|
| Example 24 | 0.52 | 94.4 | 100 | No scratching | Medium scratching |
| Example 25 | 0.43 | 94.1 | 100 | No scratching | Very light scratching |
| Example 26 | 0.54 | 94.3 | 100 | No scratching | Light scratching |
| Example 27 | 0.48 | 93.9 | 100 | No scratching | No scratching |
| Example 28 | 0.73 | 93.5 | 100 | No scratching | Very light scratching |
| Example 29 | 0.54 | 93.8 | 99.8 | No scratching | No scratching |

What is claimed is:

1. An antireflective film comprising a light transmissive substrate and a low refractive index layer disposed on the light transmissive substrate forming an interface wherein the low refractive index layer comprises the reaction product of a polymerizable resin composition comprising at least 55 wt % fumed silica and the low refractive index layer is a single layer that increases in porosity from the light transmissive substrate interface to an opposing porous surface, wherein the fumed silica has an average aggregate particle size as measured by intensity of at least 100 nm.

2. The antireflective film of claim 1 wherein the low refractive index layer has a refractive index ranging from 1.15 to 1.40.

3. The antireflective film of claim 1 wherein the low index layer has a thickness ranging from about 100 nm to about 500 nm.

4. The antireflective film of claim 1 wherein the antireflective film exhibits a haze of less than 2% or less than 1%.

5. The antireflective film of claim 1 wherein the antireflective film exhibits a transparency of at least 93%, or 94%, or 95%, or 96%, or 97%.

6. The antireflective film of claim 1 wherein the antireflective film exhibits a minimum reflectance of no greater than 2.0% for a wavelength from 450 nm to 650 nm.

7. The antireflective film of claim 1 wherein the antireflective film exhibits an average reflectance of no greater than 2.0% for a wavelength range from 450 nm to 650 nm.

8. The antireflective film of claim 1 wherein the antireflective film exhibits an absolute value of the maximum slope of reflectance at increments of 2 nm for wavelengths ranging from 450 nm to 650 nm of no greater than 0.05.

9. The antireflective film of claim 1 wherein the polymerizable resin comprises one or more ethylenically unsaturated monomer or oligomers.

10. The antireflective film of claim 1 wherein the polymerizable resin comprises a non-fluorinated monomer or oligomer having at least two free-radically polymerizable groups.

11. The antireflective film of claim 1 wherein the polymerizable resin comprises a fluorinated monomer or oligomer having at least two free-radically polymerizable group.

12. The antireflective film of claim 1 wherein the light transmissive substrate is glass or a polymeric film having a refractive index greater than the low refractive index layer.

13. The antireflective film of claim 12 wherein the polymeric film is selected from polyester, polycarbonate, or triacetyl cellulose.

14. The antireflective film of claim 1 wherein the light transmissive substrate further comprises a primer layer between the substrate and low refractive index layer.

15. The antireflective film of claim 1 wherein the light transmissive substrate further comprises a hardcoat layer between the substrate and low refractive index layer.

16. An article comprising an antireflective film of claim 1 provided in the optical path of the article.

* * * * *